United States Patent
Barnes

(10) Patent No.: US 11,034,252 B2
(45) Date of Patent: Jun. 15, 2021

(54) ELECTRIC VEHICLE CHARGING ASSEMBLY

(71) Applicant: Kristopher Barnes, Douglasville, GA (US)

(72) Inventor: Kristopher Barnes, Douglasville, GA (US)

(*) Notice: Subject to any disclaimer, the term of this patent is extended or adjusted under 35 U.S.C. 154(b) by 142 days.

(21) Appl. No.: 16/527,617

(22) Filed: Jul. 31, 2019

(65) Prior Publication Data
US 2021/0031642 A1    Feb. 4, 2021

(51) Int. Cl.
| | |
|---|---|
| *H02J 7/00* | (2006.01) |
| *B60L 53/30* | (2019.01) |
| *B60L 53/60* | (2019.01) |
| *B60L 53/12* | (2019.01) |
| *H02J 50/10* | (2016.01) |
| *H01M 10/44* | (2006.01) |

(52) U.S. Cl.
CPC ........... *B60L 53/30* (2019.02); *B60L 53/12* (2019.02); *B60L 53/60* (2019.02); *H01M 10/44* (2013.01); *H02J 50/10* (2016.02)

(58) Field of Classification Search
USPC .......................................................... 320/108
See application file for complete search history.

(56) References Cited

U.S. PATENT DOCUMENTS

| | | | |
|---|---|---|---|
| 5,669,470 A * | 9/1997 | Ross | B60L 50/51 191/10 |
| 5,821,728 A * | 10/1998 | Schwind | B60L 53/39 320/108 |
| 8,552,685 B2 | 10/2013 | Kanno | |
| 2008/0265684 A1* | 10/2008 | Farkas | B60L 50/30 307/104 |
| 2009/0045773 A1* | 2/2009 | Pandya | B60L 53/00 320/108 |
| 2010/0231163 A1 | 9/2010 | Mashinsky | |
| 2011/0031047 A1 | 2/2011 | Tarr | |
| 2011/0114401 A1* | 5/2011 | Kanno | H02J 50/12 180/65.21 |
| 2012/0217111 A1 | 8/2012 | Boys | |
| 2017/0326992 A1* | 11/2017 | Budhia | B60L 5/005 |

* cited by examiner

*Primary Examiner* — Samuel Berhanu

(57) ABSTRACT

An electric vehicle charging assembly includes a plurality of charge transmitters that are each embedded into a roadway. The charge transmitters are spaced a predetermined distance apart from each other and are distributed along an entire distance of the roadway. Moreover, each of the charge transmitters broadcasts a charging signal. A charge transceiver is coupled to an electric vehicle and the charge transceiver is in electrical communication with batteries of the electric vehicle. The charge transceiver is in wireless communication with each of the charge transmitters when the electric vehicle is driven on the roadway. The charge transceiver receives the charge signal for charging the batteries in the electric vehicle while driving.

8 Claims, 4 Drawing Sheets

ELECTRIC VEHICLE CHARGING ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to charging devices and more particularly pertains to a new charging device for wirelessly charging batteries in an electric vehicle while driving.

(2) Description of Related Art including information disclosed under 37 CFR 1.97 and 1.98.

The prior art relates to charging devices.

BRIEF SUMMARY OF THE INVENTION

An embodiment of the disclosure meets the needs presented above by generally comprising a plurality of charge transmitters that are each embedded into a roadway. The charge transmitters are spaced a predetermined distance apart from each other and are distributed along an entire distance of the roadway. Moreover, each of the charge transmitters broadcasts a charging signal. A charge transceiver is coupled to an electric vehicle and the charge transceiver is in electrical communication with batteries of the electric vehicle. The charge transceiver is in wireless communication with each of the charge transmitters when the electric vehicle is driven on the roadway. The charge transceiver receives the charge signal for charging the batteries in the electric vehicle while driving.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
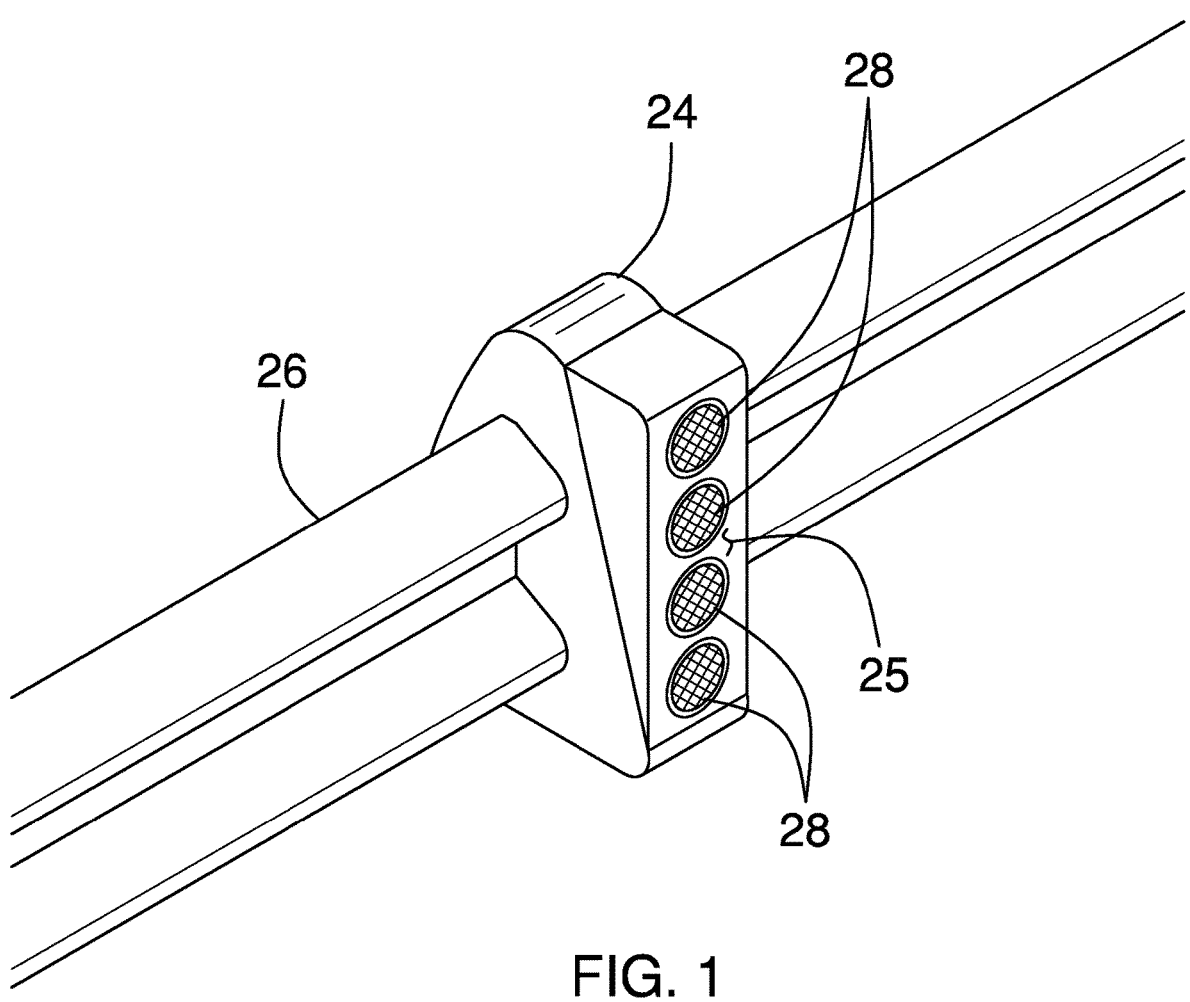
FIG. 1 is a perspective view of a housing and a plurality of receiver units of a electric vehicle charging assembly according to an embodiment of the disclosure.
Figure 2:
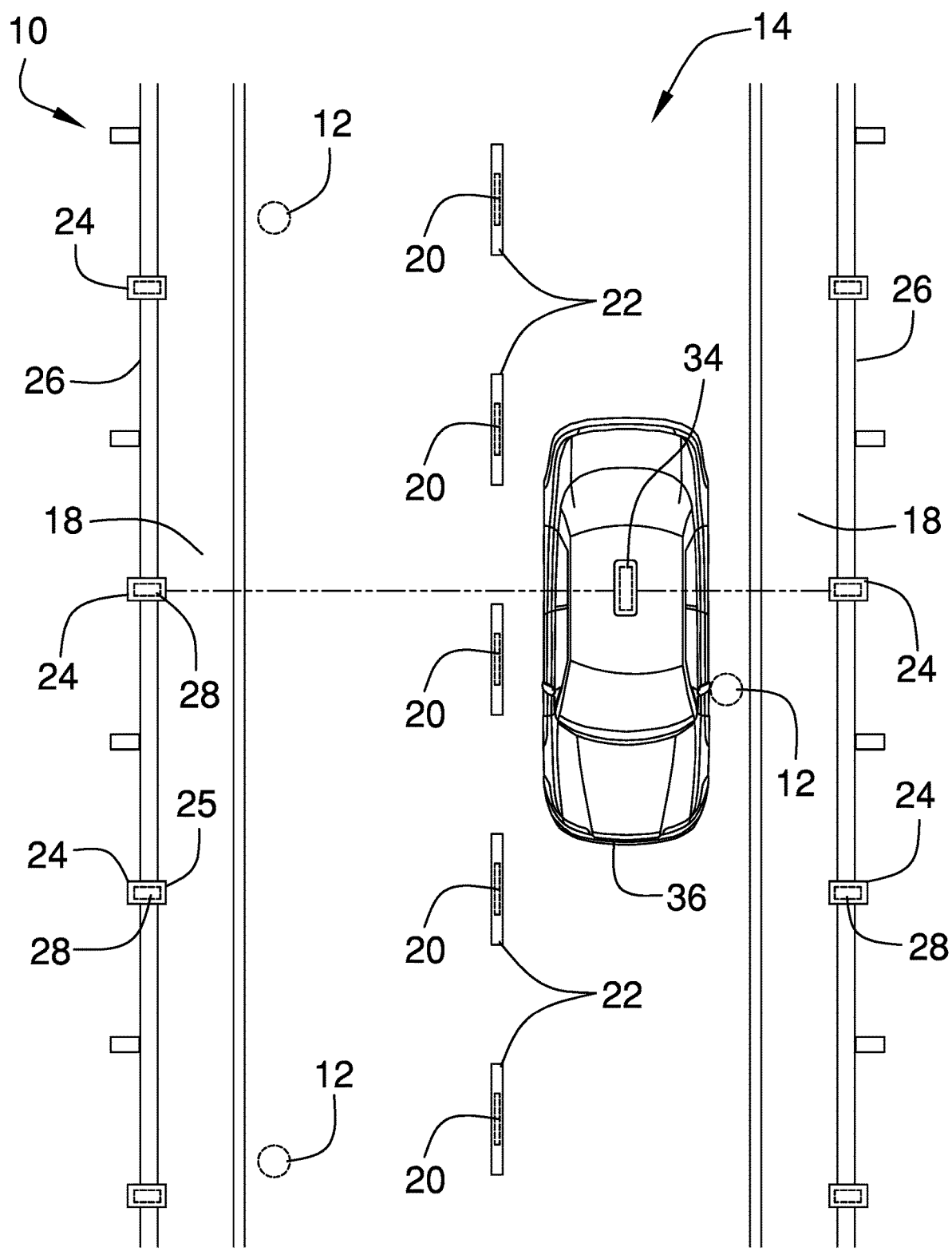
FIG. 2 is a top perspective view of an embodiment of the disclosure.

With reference now to the drawings, and in particular to FIGS. 1 through 4 thereof, a new charging device embodying the principles and concepts of an embodiment of the disclosure and generally designated by the reference numeral 10 will be described.

As best illustrated in FIGS. 1 through 4, the electric vehicle charging assembly 10 generally comprises a plurality of charge transmitters 12 that is each embedded into a roadway 14. The roadway 14 may be a state highway, an interstate highway, a city street or any other public roadway on which motor vehicles are driven. The charge transmitters 12 are spaced a predetermined distance apart from each other and are distributed along an entire distance of the roadway 14. Each of the charge transmitters 12 broadcasts a charging signal and each of the charge transmitters 12 is in electrical communication with a power source 16. Moreover, each of the charge transmitters 12 has a broadcast radius and the predetermined distance between the charge transmitters 12 ranges between approximately 75.0 percent and 90.0 percent of the broadcast radius. Each of the charge transmitters 12 is aligned with a respective one of a pair of shoulders 18 of the roadway 14. Additionally, each of the charge transmitters 12 may comprise, but not be limited to, an inductive power transfer transmitter, a resonant inductive coupling transmitter or any other any other type of near-field charging device.

A plurality of electromagnetic readers 20 is each embedded into the roadway 14. The electromagnetic readers 20 are spaced a predetermined distance apart from each other and are distributed along the entire distance of the roadway 14. Each of the electromagnetic readers 20 is aligned with centerline markings 22 on the roadway 14. Additionally, each of the electromagnetic readers 20 may comprise a magnetic resonance receiver or other type of magnetic data reading device.

A plurality of housings 24 is provided and each of the housings 24 is coupled to a guard rail 26 along the roadway 14. Each of the housings 24 has a front surface 25 and each of the housings 24 is oriented on the guardrail having the front surface 25 of each of the housings 24 being directed toward the roadway 14. The housings 24 are spaced apart from each other and are distributed along an entire distance of the guard rail 26. A plurality of receiver units 28 is provided and each of the receiver units 28 is coupled to a respective one of the housings 24. Each of the receiver units 28 is positioned on the front surface 25 of the respective housing 24. Additionally, each of the receiver units 28 may comprise a magnetic resonance receiver or other type of magnetic data reading device.

Figure 3:
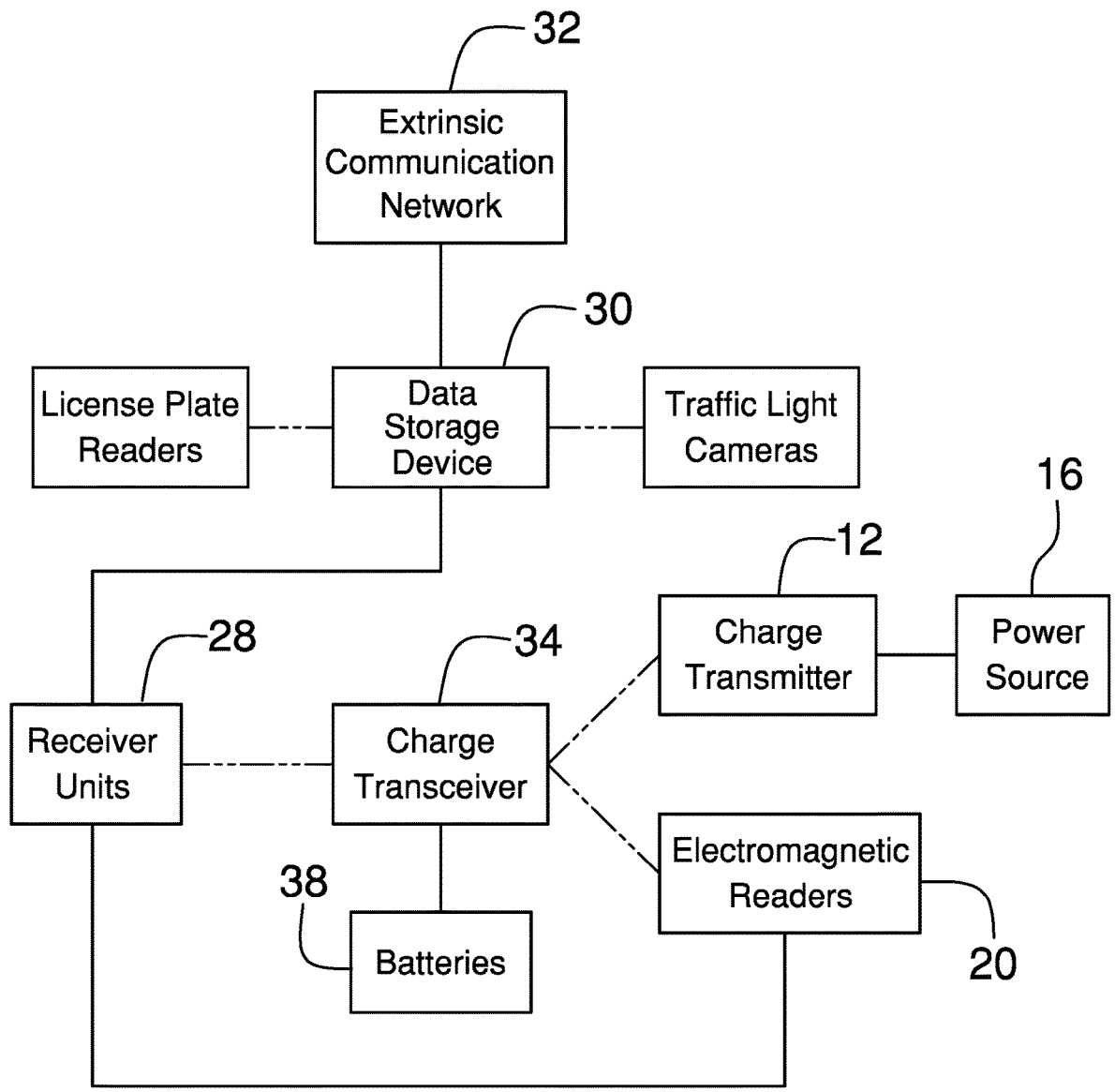
FIG. 3 is a schematic view of an embodiment of the disclosure.

A data storage device 30 is provided and the data storage device 30 is in electrical communication with each of the electromagnetic readers 20. Additionally, the data storage device 30 is in electrical communication with each of the receiver units 28. The data storage device 30 is in electrical communication with an extrinsic communication network 32, such as a state government agency or the like. In this way data gathered by each of the electromagnetic readers 20 and each of the receiver units 28 can be downloaded to the extrinsic communication network 32 for subsequent analysis. The state government agency may be the Department of Motor Vehicles for the state in which the roadway 14 is located. As is shown in FIG. 3, the data storage device 30 may be in electrical communication with license plate readers and traffic light cameras associated with the roadway 14.

A charge transceiver 34 is provided and the charge receiver is coupled to an electric vehicle 36. The electric vehicle 36 may be a solar powered electric vehicle, a hybrid electric vehicle or any other type of electric vehicle that is driven on public roadways. The charge transceiver 34 is in electrical communication with batteries 38 of the electric vehicle 36. The charge transceiver 34 is in wireless communication with each of the charge transmitters 12 when the electric vehicle 36 is driven on the roadway 14. Thus, the charge transceiver 34 receives the charge signal from each of the charge transmitters 12 when the electric vehicle 36 is driven on the roadway 14. In this way the charge transceiver 34 can harness electrical energy in the charge signal for charging the batteries 38 in the electric vehicle 36 during driving.

The charge transceiver 34 may be in electrical communication with a control module of the electric vehicle 36. Moreover, the charge transceiver 34 is in wireless communication with each of the electromagnetic readers 20 when the electric vehicle 36 is driven on the roadway 14. In this way the electromagnetic readers 20 can receive identification data from the control module of the electric vehicle 36. The charge transceiver 34 is in wireless communication with each of the receiver units 28 when the electric vehicle 36 is driven on the roadway 14. In this way the receiver units 28 can receive identification data from the control module of the electric vehicle 36. The identification data may include, but not be limited to, the license plate number of the electric vehicle 36, the VIN of the electric vehicle 36 or any other data that is unique to the electric vehicle 36.

Figure 4:
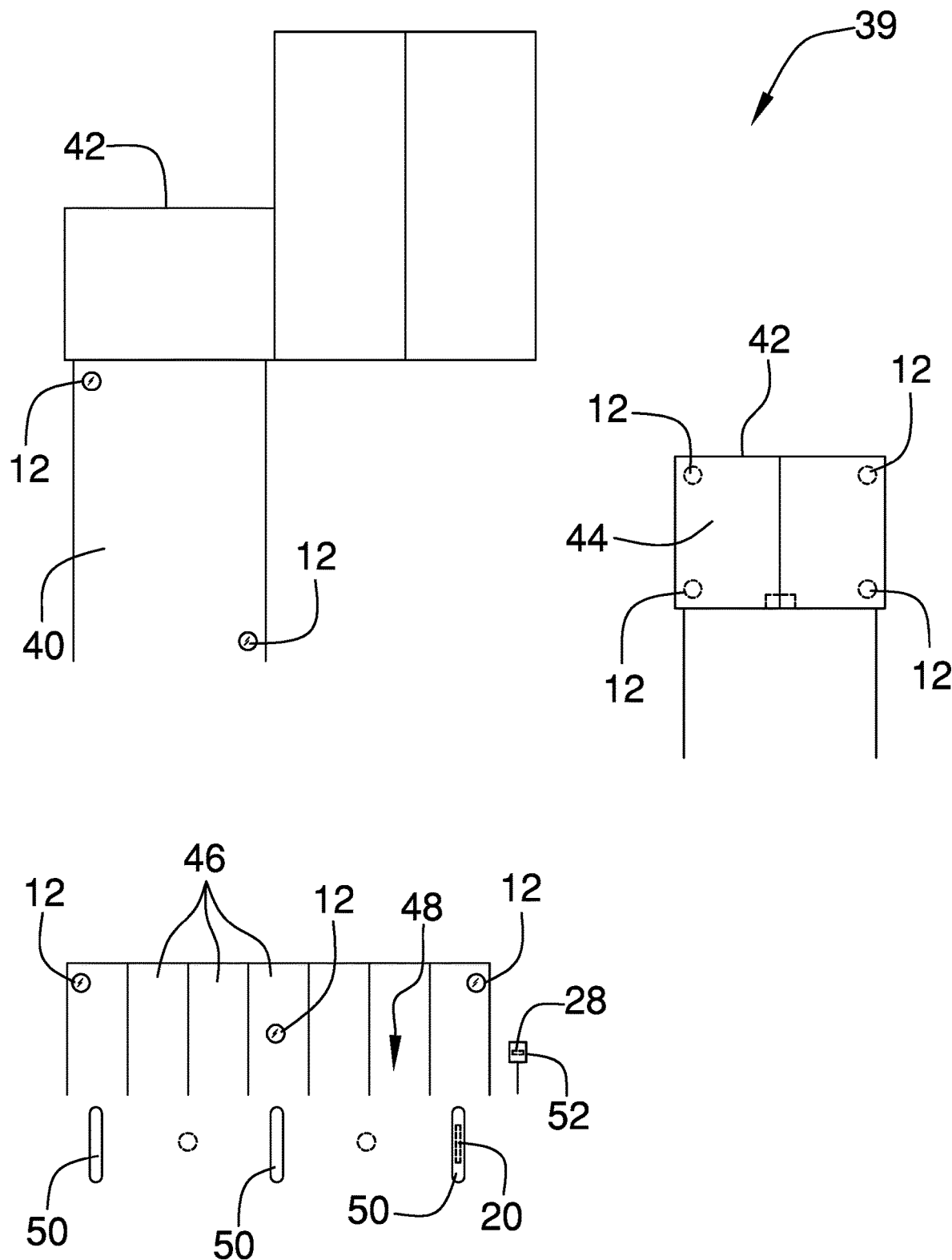
FIG. 4 is a perspective view of an alternative embodiment of the disclosure.

In an alternative embodiment 39 as is most clearly shown in FIG. 4, a plurality of the charge transmitters 12 may be embedded into a driveway 40 that services a parking garage 42 for the electric vehicle 36. In this way the electric vehicle 36 can be charged while the electric vehicle 36 is parked in the driveway 40. Additionally, the charge transmitters 12 may be embedded into a floor 44 of the parking garage 42 to charge the electric vehicle 36 when the electric vehicle 36 is parked in the parking garage 42. As is additionally shown in FIG. 4, the charge transmitters 12 may be embedded into parking spots 46 in a parking lot 48, the electromagnetic readers 20 may be embedded into speed bumps 50 in the parking lot 48 and the receiver units 28 may be coupled to a traffic sign 52 in the parking lot 48.

In use, the electric vehicle 36 passes next to each of the charge transmitters 12 when the electric vehicle 36 is driven on the roadway 14. The charge transceiver 34 receives the charge signal from each of the charge transmitters 12 to harness the electrical energy in the charge signal. In this way the charge transceiver 34 charges the batteries 38 of the electric vehicle 36 while the electric vehicle 36 is being driven. Thus, the effective range of the electric vehicle 36 is increased while the electric vehicle 36 is being driven. Each of the electromagnetic readers 20 and the receiver units 28 receives data from the charge transceiver 34 for subsequent analysis.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric vehicle charging assembly being configured to charge an electric vehicle while the electric vehicle is being driven, said assembly comprising:

a plurality of charge transmitters, each of said charge transmitters being embedded into a roadway, said charge transmitters being spaced a predetermined distance apart from each other and being distributed along an entire distance of the roadway, each of said charge transmitters broadcasting a charging signal;

a plurality of electromagnetic readers, each of said electromagnetic readers being embedded into the roadway;

a plurality of housings, each of said housings being coupled to a guard rail along the roadway;

a plurality of receiver units, each of said receiver units being coupled to a respective one of said housings, each of said receiver units being positioned on said front surface of said respective housing;

a data storage device being in electrical communication with each of said electromagnetic readers, said data storage device being in electrical communication with each of said receiver units, said data storage device being in electrical communication with an extrinsic communication network thereby facilitating data gathered by each of said electromagnetic readers and each of said receiver units to be downloaded to the extrinsic communication network for subsequent analysis; and a charge transceiver being coupled to an electric vehicle, said charge transceiver being in electrical communication with batteries of the electric vehicle, said charge transceiver being in wireless communication with each of said charge transmitters when the electric vehicle is driven on the roadway, said charge transceiver receiving said charge signal from each of said charge transmitters when the electric vehicle is driven on the roadway wherein said charge transceiver is configured to harness electrical energy in the charge signal for charging the batteries in the electric vehicle during driving.

2. The assembly according to claim 1, wherein:
each of said charge transmitters is in electrical communication with a power source;
each of said charge transmitters has a broadcast radius, said predetermined distance ranging between approximately 75.0 percent and 90.0 percent of said broadcast radius; and
each of said charge transmitters is aligned with a respective one of a pair of shoulders of the roadway.

3. The assembly according to claim 1, wherein said electromagnetic readers are spaced a predetermined distance apart from each other and are distributed along the entire distance of the roadway, each of said electromagnetic readers being aligned with centerline markings on the roadway.

4. The assembly according to claim 1, wherein each of said housings has a front surface, each of said housings being oriented on the guardrail having said front surface of each of said housings being directed toward the roadway, said housings being spaced apart from each other and being distributed along an entire distance of the guard rail.

5. The assembly according to claim 1, wherein said charge transceiver is in electrical communication with a control module of the electric vehicle.

6. The assembly according to claim 5, wherein said charge transceiver is in wireless communication with each of said electromagnetic readers when the electric vehicle is driven on the roadway thereby facilitating said electromagnetic readers to receive identification data from the control module of the electric vehicle.

7. The assembly according to claim 6, wherein said charge transceiver is in wireless communication with each of said receiver units when the electric vehicle is driven on the roadway thereby facilitating said receiver units to receive identification data from the control module of the electric vehicle.

8. An electric vehicle charging assembly being configured to charge an electric vehicle while the electric vehicle is being driven, said assembly comprising:
a plurality of charge transmitters, each of said charge transmitters being embedded into a roadway, said charge transmitters being spaced a predetermined distance apart from each other and being distributed along an entire distance of the roadway, each of said charge transmitters broadcasting a charging signal, each of said charge transmitters being in electrical communication with a power source, each of said charge transmitters having a broadcast radius, said predetermined distance ranging between approximately 75.0 percent and 90.0 percent of said broadcast radius, each of said charge transmitters being aligned with a respective one of a pair of shoulders of the roadway;
a plurality of electromagnetic readers, each of said electromagnetic readers being embedded into the roadway, said electromagnetic readers being spaced a predetermined distance apart from each other and being distributed along the entire distance of the roadway, each of said electromagnetic readers being aligned with centerline markings on the roadway;
a plurality of housings, each of said housings being coupled to a guard rail along the roadway, each of said housings having a front surface, each of said housings being oriented on the guardrail having said front surface of each of said housings being directed toward the roadway, said housings being spaced apart from each other and being distributed along an entire distance of the guard rail;
a plurality of receiver units, each of said receiver units being coupled to a respective one of said housings, each of said receiver units being positioned on said front surface of said respective housing;
a data storage device being in electrical communication with each of said electromagnetic readers, said data storage device being in electrical communication with each of said receiver units, said data storage device being in electrical communication with an extrinsic communication network thereby facilitating data gathered by each of said electromagnetic readers and each of said receiver units to be downloaded to the extrinsic communication network for subsequent analysis; and
a charge transceiver being coupled to an electric vehicle, said charge transceiver being in electrical communication with batteries of the electric vehicle, said charge transceiver being in wireless communication with each of said charge transmitters when the electric vehicle is driven on the roadway, said charge transceiver receiving said charge signal from each of said charge transmitters when the electric vehicle is driven on the roadway wherein said charge transceiver is configured to harness electrical energy in the charge signal for charging the batteries in the electric vehicle during driving, said charge transceiver being in electrical communication with a control module of the electric vehicle, said charge transceiver being in wireless communication with each of said electromagnetic readers when the electric vehicle is driven on the roadway thereby facilitating said electromagnetic readers to receive identification data from the control module of the electric vehicle, said charge transceiver being in wireless communication with each of said receiver units when the electric vehicle is driven on the roadway thereby facilitating said receiver units to receive identification data from the control module of the electric vehicle.

* * * * *